United States Patent
Aepli et al.

(10) Patent No.: US 9,546,272 B2
(45) Date of Patent: *Jan. 17, 2017

(54) STAIN-RESISTANT ARTICLE AND USE THEREOF

(71) Applicant: EMS-PATENT AG, Domat/Ems (CH)

(72) Inventors: Etienne Aepli, Domat/Ems (CH); Mark Pfleghar, Domat/Ems (CH); Botho Hoffmann, Domat/Ems (CH); Heinz Hoff, Tamins (CH)

(73) Assignee: EMS-PATENT AG, Domat/EMS (CH)

( * ) Notice: Subject to any disclaimer, the term of this patent is extended or adjusted under 35 U.S.C. 154(b) by 181 days.

This patent is subject to a terminal disclaimer.

(21) Appl. No.: 14/136,861

(22) Filed: Dec. 20, 2013

(65) Prior Publication Data

US 2014/0179850 A1     Jun. 26, 2014

(30) Foreign Application Priority Data

Dec. 21, 2012 (EP) .................................... 12198915

(51) Int. Cl.

| | |
|---|---|
| *C08L 77/06* | (2006.01) |
| *C08K 3/30* | (2006.01) |
| *C08G 69/14* | (2006.01) |
| *C08G 69/26* | (2006.01) |
| *C08K 7/14* | (2006.01) |
| *C08K 3/22* | (2006.01) |

(52) U.S. Cl.
CPC .............. *C08L 77/06* (2013.01); *C08G 69/14* (2013.01); *C08G 69/26* (2013.01); *C08K 3/30* (2013.01); *C08K 7/14* (2013.01); *C08K 3/22* (2013.01); *C08L 2205/02* (2013.01)

(58) Field of Classification Search
CPC .................... C08L 2205/02; C08K 2203/2241; C08K 2003/3036
See application file for complete search history.

(56) References Cited

U.S. PATENT DOCUMENTS

| | | | |
|---|---|---|---|
| 7,820,757 B2* | 10/2010 | Plachetta et al. ............. | 524/606 |
| 8,563,653 B2* | 10/2013 | Buehler et al. ................. | 525/66 |
| 2002/0173584 A1* | 11/2002 | Ebert et al. ................... | 524/538 |
| 2004/0034152 A1* | 2/2004 | Oka et al. ..................... | 524/497 |
| 2004/0046279 A1 | 3/2004 | Studholme | |
| 2009/0163634 A1* | 6/2009 | Buhler et al. ................. | 524/322 |
| 2010/0022742 A1* | 1/2010 | Buhler et al. ................. | 528/323 |
| 2011/0023986 A1* | 2/2011 | Hoffmann et al. ........... | 138/118 |
| 2011/0040023 A1* | 2/2011 | Buhler et al. ................. | 524/538 |
| 2011/0184099 A1* | 7/2011 | Hewel et al. ................. | 524/101 |
| 2012/0149816 A1* | 6/2012 | Lee et al. ..................... | 524/133 |
| 2014/0066560 A1* | 3/2014 | Stoppelmann et al. ...... | 524/407 |
| 2014/0179850 A1* | 6/2014 | Aepli et al. .................. | 524/420 |
| 2014/0179866 A1* | 6/2014 | Pfleghar et al. .............. | 524/607 |
| 2015/0175803 A1* | 6/2015 | Stoppelmann ................ | 524/451 |
| 2015/0175804 A1* | 6/2015 | Aepli ............................ | 524/451 |

FOREIGN PATENT DOCUMENTS

| | | | |
|---|---|---|---|
| EP | 0 725 101 | A1 | 8/1996 |
| EP | 0 837 087 | A1 | 4/1998 |
| EP | 1 570 983 | A1 | 9/2005 |
| EP | 1882719 | A1 | 1/2008 |
| EP | 2028231 | A1 | 2/2009 |
| EP | 2608276 | A1 | 6/2013 |
| JP | 2012136620 | A | 7/2012 |
| WO | 2009/132989 | A2 | 11/2009 |
| WO | 2012/049252 | A2 | 4/2012 |
| WO | 2012/049255 | A1 | 4/2012 |

OTHER PUBLICATIONS

Corresponding Office Action for EP Patent Application No. 12198915.6, dated May 24, 2013.
Search Report, dated Feb. 11, 2014, issued by the European Patent Office, in counterpart Application No. 13196210.
Search Report, issued by the European Patent Office, in counterpart Application No. 15169586, dated Oct. 26, 2015.

* cited by examiner

*Primary Examiner* — Michael A Salvitti
(74) *Attorney, Agent, or Firm* — Sughrue Mion, PLLC

(57) ABSTRACT

A polyamide molding composition for the production of a stain-resistant article, the staining tendency (ST) of the article being at least 2. The composition contains 30-100% by weight of a polyamide or a polyamide mixture, consisting of 50-100% by weight of at least one amorphous and/or microcrystalline polyamide having a glass transition temperature of at least 100° C., based on: 20-100 mol % of at least one cycloaliphatic diamine; and 0-80 mol % of at least one other aliphatic and/or aromatic diamine; and also aromatic and/or aliphatic dicarboxylic acids comprising at least 6 carbon atoms, and 0-50% by weight of at least one semi-aromatic polyamide. In addition, the molding composition comprises any of inorganic white pigments, fillers, impact toughness modifier and/or flame retardants.

23 Claims, No Drawings

STAIN-RESISTANT ARTICLE AND USE THEREOF

TECHNICAL FIELD

The present invention relates to the use of moulding compositions for articles, in particular casings or casing parts for electronically portable devices, which have a low staining tendency.

PRIOR ART

In particular in conjunction with the production of casings for mobile telephones, portable computers, etc. for example, there is the problem that certain materials normally used for this purpose are soiled or stained when they come into contact with substances, which, with use as intended, may easily come into contact with such casings, in such a way that this staining can no longer be removed sustainably. This is a severe disadvantage, which is already known in principle in conjunction with polyamide from quite different applications, for example from the production of carpets or the like. In this regard, it has already been proposed accordingly to apply a coating to the polyamide used as a base material, said coating reducing the susceptibility for dirt pick-up. Such additional coatings or dips are not a sustainable solution however, since they normally do not remain on the surface for a relatively long period of time if the surface is mechanically loaded or comes into contact with water, sweat and/or solvents.

US2004/046279 describes the production of polyamide-based fibres with high soiling resistance, wherein a semi-aromatic polyamide can also be used inter alia as a base. Here, the polyamide is reacted during the production process with a special reagent, specifically a terpolymer, optionally in combination with a semi-crystalline thermoplastic polyester or a semi-crystalline thermoplastic polyamide, in order to increase the resistance.

WO2012/049252A2 describes stain-resistant articles based on semi-aromatic, semi-crystalline, non-transparent polyamide moulding compositions having a high melting point, which contain terephthalic acid and an aliphatic diamine comprising at least 8 C atoms, for example systems of the 9T or 10T type. In addition, these moulding compositions necessarily contain a reinforcing agent and a white pigment. The articles are to have a whiteness (L*, brightness) of at least 70 in the CIE colour space, measured in accordance with ASTM E308-08. Inter alia, it has been found that the white-pigmented and glass-fibre-reinforced semi-aromatic polyamide moulding compositions based on 9T and 10T pick up the colour of the blusher used as a test to a lesser extent than the polyamides PA 66, PA 1010 or PA 6T/66.

WO2012/049255A1 likewise describes articles, in particular casings for portable electronic devices, produced from semi-aromatic, semi-crystalline, non-transparent polyamides with a high melting point, which are to have high stain resistance. The polyamides are based on the following monomers: terephthalic acid, isophthalic acid and aliphatic diamines comprising 6 carbon atoms. The moulding compositions likewise contain a reinforcing agent and a white pigment. In this case too, a whiteness of at least 70 is required. In the examples, it is shown that the moulding composition based on the semi-crystalline, semi-aromatic polyamide PA 6T/6I has a lower staining tendency compared to the semi-crystalline polyamide moulding compositions based on PA 66 and PA 6T/66.

EP-A-0 725 101 discloses colourless, amorphous polyamides or blends and alloys thereof as well as formed parts produced thereof with high alternate bending strength. They are based on alkyl substituted cycloaliphatic 14-22C diamines and unbranched aliphatic 8-14C dicarboxylic acids or on unbranched aliphatic 8-14C diamines with cycloaliphatic 7-36C dicarboxylic acids. The pure colourless amorphous polyamides are described and mixtures are only mentioned in a side remark.

EP-A-0 837 087 describes polyamide moulding compositions or blends and alloys thereof, for the production of articles for (electro-) optical applications. The moulding composition is based on at least one polyamide-homopolymer of long chain aliphatic monomers and cycloaliphatic monomers. As blends mixtures with polyamide 12 or polyamide 11 are proposed and further amorphous polyamides.

EP-A-1 570 983 describes composite materials with formed parts based on a transparent or translucent colorable plastic moulding comprising a lubricant. The formed parts are provided with at least one transparent or translucent surface layer, decoration layer, functional layer, rubber or another plastic material. The polyamides are e.g. based on MACM, blends are only disclosed in combination with aliphatic, polyamides.

WO 2009/132989 discloses polyamide moulding compositions characterised by a good processability, in particular in injection moulding, at acceptable deformation in the climatic test, by good transparency, low haze and even increased bio content. The polyamide moulding compositions on the basis of transparent copolyamides comprise: (A) 40-100% by weight of at least one transparent copolyamide with a glass transition temperature (Tg) of at least 80° C. and at most 150° C., based on at least two different diamines selected from a mixture of (a) 50-90 mol-% MACM and/or EACM and/or TMACM and (b) 10-50 mol-% aliphatic diamine with 9-14 carbon atoms, in each case with respect to the total amount of diamines, as well as on one or several aliphatic dicarboxylic acids, in particular with 6-36 carbon atoms, (B) 0-60% by weight of at least one polymer, (C) 0-10% by weight additives, wherein the sum of the components (A)-(C) makes up 100% by weight. Mixtures with other polyamides are described, however only with aliphatic other polyamide systems.

DISCLOSURE OF THE INVENTION

The object of the present invention is accordingly, inter alia, to provide articles, in particular casings or casing parts for portable electronic devices, having improved stain resistance. In addition, these articles have good mechanical properties, in particular high rigidity, high strength, good impact toughness, and high dimensional stability, and in particular also good surface properties and in addition good processing properties, in particular such as low moulding shrinkage and low warping. The underlying polyamide moulding compositions (compounds) are characterised in addition to the unexpectedly low staining tendency by low water absorption, sufficient thermal stability, good chemical resistance and good mechanical properties.

The stain resistance is achieved by producing the articles, the casings or casing parts from moulding compositions containing polyamides based on cycloaliphatic diamines.

Within the context of the invention, stain resistance means that the articles or casings in contact with dyestuffs used in daily life, such as makeup (lipstick, lipgloss, blusher) or natural and synthetic colorants, for example in soft drinks, ketchup, red wine, mustard, or dyes and pigments in clothing or leather, experience no lasting colour changes or only very slight lasting colour changes.

This object is achieved by the use according to Claim 1, in particular by the use of such moulding compositions for the production of stain-resistant components or casings for portable electronic devices.

Specifically, the present invention relates to stain-resistant articles based on a polyamide moulding composition and to the use of such moulding compositions for this purpose, wherein the moulding composition contains or consists of:

(A) 30-100% by weight of a polyamide or a polyamide mixture, consisting of:
  (A1) 50-100% by weight of at least one amorphous and/or microcrystalline polyamide having a glass transition temperature of at least 100° C., based on:
    (a1) 20-100 mol % of at least one cycloaliphatic diamine; and 0-80 mol % of at least one other aliphatic and/or aromatic diamine (wherein the mol % within the component (a1) together form 100 mol % of diamines); and
    (a2) aromatic and/or aliphatic dicarboxylic acids comprising at least 6 carbon atoms,
    with the proviso that up to 45 mol % of the totality of monomers of components (a1) and (a2) can be replaced by lactams comprising 6 to 12 carbon atoms or amino carboxylic acids comprising 6 to 12 carbon atoms; wherein (A1) and (A2) together form 100% of component (A);
  (A2) 0-50% by weight of at least one semi-aromatic polyamide different from (A1);
(X) 0.01-20% by weight, preferably 0.5-10% by weight, particularly preferably 2-7% by weight of one or several inorganic white pigments;
(B) 0-70% by weight of fibrous fillers (B1), in particular glass fibres, and/or particulate fillers (B2) with the exception of inorganic white pigments;
(C) 0-30% by weight of an impact toughness modifier and/or polymers different from (A)
(D) 0-25% by weight of a flame retardant, wherein this is preferably halogen-free,
(E) 0-3% by weight of additives;
wherein the sum of the constituents (A)-(E) makes up 100% by weight.

As component (X) therefore inorganic white pigments are used. Preferably component (X) consists of the inorganic white pigments selected from the group consisting of: barium sulphate, zinc oxide, zinc sulphide, lithopone and titanium dioxide (Rutile, Anatase), as well as titanium-zinc-mixed oxides, wherein these white pigments preferably have an average particle size (D50) in the range of 0.1-40 μm, preferably in the range of 0.1-20 μm, particularly preferably in the range of 0.1-10 μm. The proportion of the fibrous fillers (B1) to the inorganic white pigments (X) can be in the range of 30:1 to 1:5, in the range of 10:1 to 1:10, in the range of 5:1 to 1:5 or in the range of 15:1 to 1:2.

Here, the use is intended for the production of a stain-resistant article, the staining tendency (ST) of the article preferably being at least 2.

The component (A) therefore consists either of one or more polyamides of the structure (A1) or a mixture of one or more such polyamides with semi-aromatic polyamides (A2), wherein the component (A2) in this mixture makes up at most 50% by weight, preferably at most 40% by weight, and particularly preferably at most 35% by weight, based on the polyamide mixture A. Component A2 is thus preferably used in the range of 0-40, for example in the range of 5-35% by weight, in each case based on component A.

Here, the proportion of component (A) preferably lies in the range of 30-90% by weight, preferably in the range of 30-80% by weight.

The proportion of component (B) preferably lies in the range of 10-65% by weight, preferably in the range of 20-60% by weight.

The proportion of component (C) preferably lies in the range of 1-25% by weight, preferably in the range of 2-15% by weight.

The proportion of component (D) preferably lies in the range of 5-25% by weight, preferably in the range of 5-20% by weight.

The proportion of component (E) preferably lies in the range of 0.1-2% by weight, preferably in the range of 0.2-1.5% by weight.

Articles, moulded bodies or moulded parts according to the invention have a low staining tendency (ST). In other words, the E value (colour location) determined in the CIELAB colour space in accordance with EN ISO 11664-4 is only slightly changed by the staining test described below. More specifically, this means that the ΔE value established in the staining test described below is at most 6, preferably at most 5, particularly preferably at most 4. At the same time, the articles have a brightness L*, both before and after staining, of preferably >80, preferably >90, particularly preferably >95. Alternatively or additionally, the value of a* or, independently thereof, the value of b* is preferably <10, preferably <5, particularly preferably <3, most preferably in the region of 0 in each case. For the components, L* values of >96 are particularly preferred.

The CIE L*, a*, and b* values were determined using a spectrophotometer by Datacolor (apparatus name: Datacolor 650) under the following measurement conditions against a contrast sheet painted white—measurement mode: reflection; measurement geometry: D/8°; light type: D6510; gloss: locked in; calibration: UV-calibrated; measuring diaphragm: SAV (small area view, 9 mm illuminated, 5 mm measured). With use of the L*, a*, and b* values of reference and sample corresponding to the CIELAB system (EN ISO 11664-4, to 2011 DIN 6174), the colour brightness difference ΔL* is calculated as follows:

$$\Delta L^* = L^*_{sample} - L^*_{reference}$$

The colour difference ΔE between the colour locations $(L^*a^*b^*)_{reference}$ and $(L^*a^*b^*)_{sample}$ is calculated in accordance with ISO 12647 and ISO 13655 as a Euclidean difference as follows:

$$\Delta E = \sqrt{(L^*_{sample} - L^*_{reference})^2 + (a^*_{sample} - a^*_{reference})^2 + (b^*_{sample} - b^*_{reference})^2}$$

The staining tendency (ST) in the described staining test is quantified by the change of the colour impression ΔE; it is classified as follows:
ST=1: no staining or only very slight staining (0≤ΔE≤2)
ST=2: slight staining (2<ΔE<6)
ST=3: considerable staining (6<ΔE≤12)
ST=4: heavy staining (corresponds to an ΔE>12)

Articles (moulded parts, components) according to the invention have a staining tendency of 1 or 2, that is to say the ΔE value is 6 at most.

The staining tendency of the moulded parts is tested by means of the following staining media:
- lipgloss: Maybelline Colour Sensational Cream Gloss Fabulous Pink 137 (Maybelline New York, Jade Düsseldorf, Gemey-Paris, 16 Place Vendome, 75001 Paris) or
- mustard: Thomy scharfer (hot) mustard (Nestle Suisse AG, 1800 Vevey, Switzerland)

These media were selected from a large group of tested agents because they cause the greatest colour changes on the moulded parts produced from polyamide and therefore provide the best distinction with regard to the staining tendency. For example, olive oil, sun cream or conventional ketchup only cause very slight colour changes on the test specimens, which makes it difficult or impossible to distinguish between the polyamide moulding compositions used.

During the staining test, the staining media are applied in a saturated manner to the surface of the test specimens (dimension: 2×40×50 mm) using a cotton pad. The test specimens thus prepared and the untreated reference test specimens are then subjected to storage over 24 or 72 hours in a climatic cabinet at 65° C. and a relative humidity of 90%. After storage, the test specimens are brought to 23° C. and the surface of the test specimens is then cleaned under flowing, lukewarm water with a sponge provided with aqueous soap solution until the sample surface is free from adhering residues of the staining medium. The reference colour plates without staining medium are also subjected to the cleaning step. Once the reference and test plates have been cleaned, the L*, a* and b* values are determined as described above, and the ΔL* and ΔE values are calculated.

The present invention preferably relates to an article or moulded body or moulded parts, which consist at least in part of polyamide moulding compositions of this type, produced with use of a polyamide moulding composition as specified above and also further below, particularly preferably in the form of or as part of an electrical or electronic component, a casing or a casing component part.

In a preferred embodiment, the present invention includes articles, in particular casings or casing parts, for portable electronic devices having improved stain resistance. The term "portable" means that the electronic devices are designed such that they can be comfortably transported and used at various locations. For example, the portable electronic devices are mobile telephones, Smartphones, organisers, laptop computers, notebook computers, tablet computers, radios, cameras, watches, calculators, music or video players, navigation devices, GPS devices, electronic picture frames, external hard drives and other electronic storage media, etc. The term casing or casing part is intended to mean the entire spectrum of casing parts, such as the cover, cover plate, cover hood or lid, frame or supporting casing parts, such as the backbone, in particular the back cover, front cover, antenna casing, frame, backbone of a mobile telephone, Smartphone or computer, wherein a backbone is to be understood to mean a structural component on which further electronic components are assembled, such as a battery terminal, antenna, screen, connectors, processors, keypads, keyboards and other electronic components. Here, the backbone may constitute an inner component or a structure partly visible from the outside. The casing parts used as a cover have the function inter alia of protecting inner components and the electronic components against soiling, influences of force (for example impact caused by dropping) or damage caused by environmental influences, such as dust, liquids, radiation or gases. In addition, the casings or casing parts may also act as a structural component and may thus lend strength to the device. With use as intended, the use is preferably directed to components or regions thereof that are arranged directly at the surface, without a further layer arranged thereabove, and that are therefore exposed to soiling. Uses as coatings of casing parts are thus also considered.

In a preferred embodiment, the term casing is to be understood to mean a casing of a mobile telephone or Smartphones, in particular a back cover, front cover, antenna casing, frame, or backbone of a mobile telephone. Here, the casing may consist of one or more parts. The articles according to the invention, in particular the casings for portable electronic devices, can be produced by various thermoplastic processing processes, in particular by injection moulding or extrusion, from the proposed moulding compositions. The articles are preferably an object moulded in the injection moulding or extrusion process or a coated object.

In a broader sense however, the invention also comprises articles or moulded parts, in particular casings or casing parts, of domestic devices and domestic machines, devices and appliances for telecommunication and consumer electronics, inner and outer parts in the automotive sector and in the field of other transport means, inner and outer parts, preferably with a supporting or mechanical function in the field of electrical engineering, furniture, sport, mechanical engineering, sanitation and hygiene, medicine, power engineering and drive technology. In addition, the invention also comprises yarns, fibres, bi-component fibres, staple fibres (preferably crimped and/or textured and/or cut to a length of 30-140 mm), filaments and monofilaments, produced from the moulding compositions according to the invention by means of known spinning methods (melt spinning, wet spinning). In particular, flame-retardant yarns, fibres, staple fibres, bi-component fibres, filaments or monofilaments are preferably included here for the production of textile fabrics, such as seat covers, carpets, curtains or net curtains, for use in public buildings and in restaurants or in mobile transport means, in particular in aircraft, trains and motor vehicles.

The component (A) of the moulding composition contains at least 50% by weight of at least one polyamide based on cycloaliphatic diamines (A1) and up to 50% by weight of a semi-aromatic polyamide (A2).

The component (A1) preferably contains or consists of a polyamide, which can be formed from cycloaliphatic diamines and further aliphatic, cycloaliphatic or aromatic monomers. Specifically, component (A1) contains or consists of amorphous or microcrystalline polyamides based on cycloaliphatic diamines, which have a glass transition temperature of at least 100° C., preferably of at least 120 or 130° C., and particularly preferably of at least 140 or 150° C., but preferably of no more than 220° C. or no more than 200° C. Here, both the amorphous and the microcrystalline polyamides are transparent in the wavelength range visible for the human eye, in particular provided they are not (yet) mixed with pigments. In this case, "transparent" means that moulded parts formed from the polyamides A2 alone have a high light transmission (LT) of at least 85, preferably at least 88% and in particular of more than 90%. The light transmission value, which is used as a measure for transparency, is always to be understood here within the scope of the present application as being specified in accordance with the ASTM D1003 method (light type CIE-C). Here, the light transmission was measured in the experiments detailed below using a device with the name Haze Guard Plus by BYK Gardner (DE) on round plates 70×2 mm or plates measuring 60×60×2 mm in size. The transmission value is specified for the visible wavelength range defined in accordance with CIE-C, that is to say with basic intensities approximately between 400 and 770 mm. The round plates 70×2 mm are produced for example for this purpose using an Arburg injection moulding machine in a polished mould, wherein the cylinder temperature is between 200° C. and 340° C. and the mould temperature is between 20° C. and 140° C. The amorphous polyamides have no measurable heat of fusion or only very low heat of fusion (enthalpy of fusion) of at most 4 J/g, preferably of at most 2 J/g (determined in accordance with ISO 11357-11-2 on the granulate, differential scanning calorimetry (DSC) with a heating rate of 20° C./min). The microcrystalline polyamides according to the invention have small crystallites, which do not significantly scatter the visible light, and have a moderate heat of fusion in the range of 4-25 J/g, preferably of 8-22 J/g (determined in accordance with ISO 11357-11-2 on the granulate, differential scanning calorimetry (DSC) with a heating rate of 20° C./min).

The concentration of the cycloaliphatic diamine contained in component (A1) is preferably at least 20 mol %, in particular at least 40 mol % and particularly preferably at least 50 or 60 mol %, based on the sum of all diamines contained in (A1). A concentration of the cycloaliphatic diamines in the range of 60 to 100 mol %, based on the sum of all diamines of component (A1), is particularly preferred.

With regard to component (A1), suitable cycloaliphatic diamines are those comprising 6 to 24 carbon atoms, such as bis-(4-amino-3-methyl-cyclohexyl)-methane (MACM), bis-(4-amino-cyclohexyl)-methane (PACM), bis-(4-amino-3-ethyl-cyclohexyl)-methane (EACM), bis-(4-amino-3,5-dimethyl-cyclohexyl)-methane (TMDC), 2,6-norbornanediamine or 2,6-bis-(aminomethyl)-norbornane or 1,3-diaminocyclohexane, 1,4-diaminocyclohexanediamine, isophoronediamine, 1,3-bis-(aminomethyl)cyclohexane, 1,4-bis-(aminomethyl)cyclohexane, 2,2-(4,4'-diaminodicyclohexyl)propane (PACP), or mixtures thereof. In particular, alkyl-substituted bis-(aminocyclohexyl)methane or bis-(aminocyclohexyl)propane is preferred. Linear and/or branched C1-C6, preferably C1-C4 alkyl groups are preferred as alkyl substituents, therefore in particular methyl groups, ethyl groups, propyl groups, isopropyl or butyl groups, with methyl groups being preferred in particular. Bis-(4-amino-3-methyl-cyclohexyl)-methane (MACM) and bis-(4-amino-3,5-dimethyl-cyclohexyl)-methane (TMDC) are used as alkyl-substituted bis-(aminocyclohexyl)methane in a particularly preferred embodiment. The cycloaliphatic diamines PACM, MACM and TMDC are particularly preferred.

Besides the cycloaliphatic diamines, other aliphatic and aromatic diamines can also be used, within a limited scope, to form the polyamides (A1), for example 1,4-butanediamine, 1,5-pentanediamine, 2-methyl-1,5-pentanediamine, 2-butyl-2-ethyl-1,5-pentanediamine, 1,6-hexanediamine, 2,2,4-trimethylhexamethylenediamine, 2,4,4-trimethylhexamethylenediamine, 1,8-octanediamine, 2-methyl-1,8-octanediamine, 1,9-nonanediamine, 1,10-decanediamine, 1,11-undecanediamine, 1,12-dodecanediamine, 1,13-tridecanediamine, 1,14-tetradecanediamine, m-xylylenediamine and p-xylylenediamine. Straight-chain aliphatic diamines comprising 6-10 carbon atoms, in particular 1,6-hexanediamine, are preferred. These other diamines within the component (A1) do not make up more than 80 mol % of the totality of diamines in component (A1) however, and preferably make up no more than 60 mol %, particularly preferably no more than 40 mol % of the totality of diamines in component (A1). The component (A1) is particularly preferably substantially free from such further other diamines that are not cycloaliphatic. Dicarboxylic acids (a2) suitable for the polyamide (A1) are: adipic acid, suberic acid, azelaic acid, sebacic acid, undecane diacid, dodecane diacid, tridecane diacid, tetradecane diacid, pentadecane diacid, hexadecane diacid, heptadecane diacid, octadecane diacid, C36-dimer fatty acid, isophthalic acid, terephthalic acid, naphthalene dicarboxylic acid, cis- and/or trans-cyclohexane-1,4-dicarboxylic acid and/or cis- and/or trans-cyclohexane-1,3-dicarboxylic acid (CHDA), and mixtures thereof. Aromatic dicarboxylic acids and straight-chain aliphatic dicarboxylic acids are preferred. The dicarboxylic acids terephthalic acid, isophthalic acid, sebacic acid and dodecane diacid are particularly preferred. A polyamide (A1) in which the proportion of terephthalic acid is at most 50 mol %, based on the sum of all dicarboxylic acids of component (A1), is particularly preferred. In particular, it is preferable if the proportion of terephthalic acid in component A1 is less than 45 mol % or if no terephthalic acid is contained in components (A1).

The polyamides (A1) may also contain lactams or amino carboxylic acids, in particular α,ω-amino acids or lactams comprising 6 to 12 carbon atoms, as further monomers, wherein the following selection is mentioned by way of example: m-aminobenzoic acid, p-aminobenzoic acid, caprolactam (CL), α,ω-aminocaproic acid, α,ω-aminoheptanoic acid, α,ω-aminoctanoic acid, α,ω-aminononanoic acid, α,ω-aminodecanoic acid, α,ω-aminoundecanoic acid (AUA), laurolactam (LL) and α,ω-aminododecanoic acid (ADA). Caprolactam, α,ω-aminocaproic acid, laurolactam, α,ω-aminoundecanoic acid and α,ω-aminododecanoic acid are particularly preferred. The proportion of lactams or amino acids in component (A1) is 0 to 45 mol %, preferably 2-40 mol % and particularly preferably 3 to 35 mol %, in each case based on the sum of all monomers forming (A1), wherein the concentration of the cycloaliphatic diamine, based on the diamines (a1), is always at least 20 mol %.

Preferred polyamides (A1) based on cycloaliphatic diamines are MACM9, MACM10, MACM11, MACM12, MACM13, MACM14, MACM16, MACM18, PACM9, PACM10, PACM11, PACM12, PACM13, PACM14, PACM16, PACM18, TMDC9, TMDC10, TMDC11, TMDC12, TMDC13, TMDC14, TMDC15, TMDC16, TMDC17, TMDC18 or copolyamides, such as MACMI/12, MACMT/12, MACMI/MACMT/12, 6I/6T/MACMI/MACMT/12, 3-6T, 6I/MACMI/MACMT, 6I/PACMI/PACMT, 6I/6T/MACMI, MACMI/MACM36, 12/PACMI or 12/MACMT, 6/PACMT, 6/IPDT or mixtures thereof MACM9-18/PACM9-18, MACM9-18/TMDC9-18, TMDC9-18/PACM9-18, in particular MACM10/PACM10, MACM12/PACM12 and MACM14/PACM14, and mixtures thereof.

Component (A2) contains or consists of semi-aromatic polyamides based on aromatic dicarboxylic acids, in particular terephthalic acid, and aliphatic diamines. The semi-aromatic polyamides may have an amorphous or semi-crystalline morphology in this case. The semi-crystalline, semi-aromatic polyamides are preferably used. The semi-crystalline polyamides of component (A2) have a melting point of at least 250° C., preferably of at least 260° C., and particularly preferably of at least 270° C. The melting point preferably lies in the range from 250 to 330° C., in particular in the range from 260 to 320° C. The enthalpy of fusion is at least 30 J/g, preferably at least 35 J/g and particularly preferably at least 40 J/g.

The proportion of terephthalic acid in the total amount of dicarboxylic acids of component (A2) preferably lies in the range from 50 to 100 mol %, preferably in the range from 60 to 95 mol %, and particularly preferably in the range from 65 to 90 mol %.

For example, the following monomers can be considered as diamines for component (A2): 1,4-butanediamine, 1,5-pentanediamine, 2-methyl-1,5-pentanediamine, 2-butyl-2-ethyl-1,5-pentanediamine, 1,6-hexanediamine, 2,2,4-trimethylhexamethylenediamine, 2,4,4-trimethylhexamethylenediamine, 1,8-octanediamine, 2-methyl-1,8-octanediamine, 1,9-nonanediamine, 1,10-decanediamine, 1,11-undecanediamine, 1,12-dodecanediamine, 1,13-tridecanediamine, 1,14-tetradecanediamine, m-xylylenediamine and p-xylylenediamine, wherein 1,6-hexanediamine, 1,10-decanediamine and 1,12-dodecanediamine are preferred. Besides terephthalic acid, the polyamides (A2) may preferably also contain the following dicarboxylic acids: adipic acid, suberic acid, azelaic acid, sebacic acid, undecane diacid, dodecane diacid, tridecane diacid, tetradecane diacid, pentadecane diacid, hexadecane diacid, heptadecane diacid, octadecane diacid, C36-dimer fatty acid, isophthalic acid, naphthalene dicarboxylic acid, cis- and/or trans-cyclohexane-1,4-dicarboxylic acid and/or cis- and/or trans-cyclohexane-1,3-dicarboxylic acid (CHDA) and mixtures thereof. Adipic acid, isophthalic acid, sebacic acid and dodecane diacid are preferred.

Furthermore, the polyamides (A2) may also contain lactams or amino carboxylic acids, in particular α,ω-amino acids or lactams comprising 6 to 12 carbon atoms, wherein the following selection is mentioned by way of example: m-aminobenzoic acid, p-aminobenzoic acid, caprolactam (CL), α,ω-aminocaproic acid, α,ω-aminoheptanoic acid, α,ω-aminoctanoic acid, α,ω-aminononanoic acid, α,ω-aminodecanoic acid, α,ω-aminoundecanoic acid (AUA), laurolactam (LL) and α,ω-aminododecanoic acid (ADA). Caprolactam, α,ω-aminocaproic acid, laurolactam, α,ω-aminoundecanoic acid and α,ω-aminododecanoic acid are particularly preferred.

The semi-aromatic polyamides (A2) are preferably based either on aromatic dicarboxylic acids comprising 8 to 18, preferably 8 to 14 carbon atoms, or on diamines having aromatic structural units, such as PXDA and/or MXDA. Preferred aromatic dicarboxylic acids are terephthalic acid, naphthalene dicarboxylic acid and isophthalic acid. Preferred semi-aromatic polyamides are based on the following polyamide systems: 4T, 5T, DT, 6T, 9T, MT, 10T, 12T, 4I, 5I, DI, 6I, 9I, MI, 10I, 12I (D stands for 2-methyl pentane diamine and M stands for 2-methyl octane diamine). These can be combined with one another as homopolyamides and also as binary, ternary or quaternary copolyamides, provided this is allowed by the processing temperature. Furthermore, aliphatic polyamide systems, such as PA46, PA6, PA66, PA11, PA12, PA1212, PA1010, PA1012, PA610, PA612, PA69, PA81, can also be combined.

Preferred semi-aromatic polyamides are: 6T/6I, 6T/10T, 10T/612, 11/10T, 12/10T, 10T/1010, 10I/10T, 10T/1012, 9MT, and 12T.

In the case of the polyamides (A2), the semi-crystalline copolyamides 6T/6I, 10T/6T, 10T/612 and also MXD6, MXD10, MXD6/MXDI, PXD10, MXD10/PXD10 are particularly preferred.

The amorphous semi-aromatic polyamides (A2) are preferably based on straight-chain and/or branched aliphatic diamines and aromatic dicarboxylic acids and preferably contain less than 20 mol % of cycloaliphatic diamines and are preferably substantially free from cycloaliphatic diamines. With regard to the amorphous semi-aromatic polyamides (A2), the systems 6T/6I or 10T/10I or 3-6T (3-6=2,2,4- or 2,4,4-trimethylhexanediamine) are particularly preferred. The 6T/6I or 10T/10I systems have a proportion of less than 50 mol % of 6T or 10T units respectively, wherein a composition range 6T:6I or 10T/10I from 20:80 to 45:55, in particular 25:75 to 40:60 is preferred. In particular, it is preferred if component A contains at most 20% by weight, preferably at most 10% by weight of amorphous semi-aromatic polyamide (A1), and particularly preferably no amorphous semi-aromatic polyamide (A1).

In a preferred embodiment, the polyamides (A2) are formed from 55 to 100 mol % of terephthalic acid, 0 to 45 mol % of aliphatic dicarboxylic acids comprising 6 to 12 carbon atoms, 55 to 95 mol % of linear aliphatic diamines comprising 9-12 C atoms, and 5 to 45 mol % of aliphatic diamines comprising 4 to 8 C atoms. Here, the diamines comprising 10 and 12 carbon atoms, that is to say 1,10-decanediamine and 1,12-dodecanediamine, are particularly preferred. Among the diamines comprising 4-8 C atoms, 1,6-hexanediamine is preferred. Examples of such preferred polyamides are: 10T/612 (80:20) and 10T/6T (85:15).

In accordance with a further preferred embodiment, the component (A2) is a semi-aromatic, semi-crystalline copolyamide formed from 72.0-98.3% by weight of terephthalic acid (TPS), 28.0-1.7% by weight of isophthalic acid (IPS), 51.0-80.0% by weight of 1,6-hexanediamine (HMDA) and 20.0-49.0% by weight of C9-C12 diamine, wherein C9-C12 diamine is preferably a diamine selected from the group: 1,9-nonanediamine, methyl-1,8-octanediamine, 1,10-decanediamine, 1,11-undecanediamine, 1,12-dodecanediamine, or a mixture of diamines of this type, wherein 1,10-decanediamine and 1,12-dodecanediamine are preferred, and 1,10-decanediamine alone is particularly preferred. A polyamide system PA 10T/10I/6T/6I is therefore preferred, wherein the above concentrations apply.

With regard to a polymer mixture (A) containing the polyamide components A1 and A2, the following compositions are preferred:

(A1): MACM12 or MACMI/12 or TMDC12 or MACMT/MACMI/12;

(A2): 6T/6I, wherein the molar ratio is in the range from 60:40 to 80:20, or in particular lies in the range from 65:35 to 75:25, wherein the ratio 70:30 is particularly preferred.

(A1): MACM12 or MACMI/12 or TMDC12 or MACMT/MACMI/12;

(A2): 10T/6T, 12T/6T, 10T/11, 10T/12, 10T/1010, 10T/1012, 10T/106, 10T/126, or 10T/612, wherein the molar ratio lies in the range from 60:40 to 95:5, or in particular lies in the range from 70:30 to 90:10.

Here, the proportion of (A1) is 50-95% by weight, preferably 60-90% by weight, particularly preferably 70-90% by weight, based on the mixture (A).

The matrix of the polyamide moulding compositions used in accordance with the invention is based, as has been described above, preferably on amorphous polyamides or on mixtures of amorphous polyamides and semi-crystalline, semi-aromatic polyamides. This matrix may also preferably contain impact toughness modifiers or further polymers, different from component A. Moulding compositions of which the matrices with respect to the polymers consist merely of the components A1 and A2 are particularly preferred.

The polyamides (A1) or (A2) preferably have a solution viscosity $\eta_{rel}$, measured in m-cresol (0.5% by weight, 20° C.) in the range from 1.4 to 3.0, preferably in the range from 1.5 to 2.7, in particular in the range from 1.5 to 2.4.

To summarise, it can be determined that the component (A1) is preferably a homopolyamide and/or copolyamide formed from cycloaliphatic diamines and further aliphatic or aromatic monomers, preferably a mixture of an amorphous polyamide based on cycloaliphatic diamines and an amorphous, semi-aromatic polyamide (A2) and/or a semi-crystalline, semi-aromatic polyamide (A2), wherein the polyamides of component (A1) are preferably selected from the following group: MACM9, MACM10, MACM11, MACM12, MACM13, MACM14, MACM16, MACM18, PACM9, PACM10, PACM11, PACM12, PACM13, PACM14, PACM16, PACM18, TMDC9, TMDC10, TMDC11, TMDC12, TMDC13, TMDC14, TMDC15, TMDC16, TMDC18 or copolyamides thereof, such as MACM10/PACM10, MACM12/PACM12, MACM14/PACM14, PACM10/TMDC10, PACM12/TMDC12, PACM14/TMDC14 or copolyamides MACMI/12, MACMT/12, 6I/6T/MACMI/MACMT/12, 6I/MACMI/MACMT, 6I/PACMI/PACMT, 6I/6T/MACMI, MACMI/MACM36, 12/PACMI, 12/MACMT, 6/PACMT, 6/IPDT, MACM10/TMDC10, MACM12/TMDC12, and mixtures or blends thereof. MACM10, MACM12, MACM14, PACM10, PACM12, PACM14, TMDC10, TMDC12, TMDC14, MACMI/12, MACMI/MACMT/12 and 6T/6I/MACMT/MACMI/12 are particularly preferred.

The polyamides A2 are preferably selected from the following group: 6T/6I, 6T/10T, 6T/10T/10I, 6T/12, 11/10T, 12/10T, 10T/1010, 10T/612, 10I/10T, 10T/1012, 9MT, 12T, and mixtures or blends thereof.

The moulding composition preferably contains 10-65% by weight, particularly preferably 20-60% by weight of fillers and reinforcing agents (component B). It is also preferred if the ratio of the fibrous fillers (B1) to the particulate fillers (B2) lies in the range from 10:1 to 1:10 or in the range from 5:1 to 1:5. It is particularly preferred if component (B) is formed exclusively by fibrous fillers (B1), that is to say if no particulate fillers (B2) are present in the moulding composition.

The component (B1) is preferably selected from the group consisting of: glass fibres, carbon fibres, graphite fibres, aramid fibres, and nanotubes. The fibres of component (B1) can be present with a circular or non-circular cross-sectional area. Glass fibres are particularly preferred.

The component (B1) is preferably a glass fibre, which is formed or consists substantially of the components silicon dioxide, calcium oxide and aluminium oxide, and the ratio by weight of $SiO_2/(CaO+MgO)$ is less than 2.7, preferably less than 2.5 and in particular between 2.1 and 2.4. The component B1 in particular is an E-glass fibre according to ASTM D578-00.

In accordance with the invention, the glass fibre (component B1) may also be a high-strength glass fibre, which is preferably based on the ternary system silicon dioxide/aluminium oxide/magnesium oxide or on the quaternary system silicon dioxide/aluminium oxide/magnesium oxide/calcium oxide, wherein a composition of 58-70% by weight of silicon dioxide ($SiO_2$), 15-30% by weight aluminium oxide ($Al_2O_3$), 5-15% by weight of magnesium oxide (MgO), 0-10% by weight of calcium oxide (CaO) and 0-2% by weight of further oxides, such as zirconium dioxide ($ZrO_2$), boron oxide ($B_2O_3$), titanium dioxide ($TiO_2$) or lithium oxide ($Li_2O$), is preferred. The high-strength glass fibre preferably has a tensile strength of greater than or equal to 4000 MPa, and/or an elongation at tear of at least 5% and a tensile modulus of elasticity of greater than 80 GPa. Specific examples for these high-strength glass fibres of component (B1) are S-glass fibres by Owens Corning with 910 or 995 sizing, T-glass fibres by Nittobo, HiPertex by 3B, HS4-glass fibres by Sinoma Jinjing Fiberglass, R-glass fibres by Vetrotex and S-1- and S-2-glass fibres by AGY.

The glass fibres of component (B1) can be provided in the form of short fibres, preferably in the form of cut glass with a length in the range of 0.2-20 mm, or in the form of endless fibres. The moulding compositions therefore contain 0 to 70% by weight, preferably 10 to 65% by weight, and particularly preferably 20 to 60% by weight of a glass fibre (B1), which is used in the form of what are known as short fibres (for example cut glass with a length of 0.2-20 mm) or endless fibres (rovings).

The glass fibres according to the invention of component (B1) preferably have a circular or non-circular cross-sectional area.

Glass fibres with a circular cross section, that is to say round glass fibres, typically have a diameter in the range of 5-20 μm, preferably in the range of 6-17 μm and particularly preferably in the range of 6-13 μm. They are preferably used as short glass fibres (cut glass with a length from 0.2 to 20 mm).

In the case of the flat glass fibres of component (B1), that is to say glass fibres with a non-circular cross-sectional area, these glass fibres are preferably used with a dimensional ratio of the main cross-sectional axis to the secondary cross-sectional axis arranged perpendicular thereto of more than 2, preferably from 2 to 8, in particular from 2 to 5. These "flat glass fibres" have an oval or elliptical cross-sectional area, an elliptical cross-sectional area provided with one or more constrictions (what are known as cocoon fibres), a polygonal or rectangular cross-sectional area, or a practically rectangular cross-sectional area. A further characterising feature of the flat glass fibres used lies in the fact that the length of the main cross-sectional axis preferably lies in the range from 6 to 40 μm, in particular in the range from 15 to 30 μm, and the length of the secondary cross-sectional axis preferably lies in the range from 3 to 20 μm, in particular in the range from 4 to 10 μm. Here, the flat glass fibres have a maximum packing density, that is to say the cross-sectional area of the glass fibres fills a virtual rectangle, surrounding the glass fibre cross section as exactly as possible, by at least 70%, preferably at least 80% and particularly preferably by at least 85%.

To reinforce the moulding compositions according to the invention, mixtures of glass fibres with circular and non-circular cross section can also be used, wherein the proportion of flat glass fibres is preferably predominant, that is to say makes up more than 50% by weight of the total mass of fibres.

The glass fibres according to the invention are preferably provided with a sizing suitable for the respective thermoplastics, in particular for polyamide, for example containing a coupling agent based on an aminosilane compound or epoxysilane compound.

The high-strength glass fibres used as roving within the component (B1) in accordance with a further preferred embodiment preferably have a diameter from 8 to 20 μm, preferably from 12 to 18 μm, wherein the cross section of the glass fibres can be round, oval, elliptical, elliptical provided with one or more constrictions, polygonal, rectangular or practically rectangular. "Flat glass fibres" with a ratio of the cross-sectional axes from 2 to 5 are particularly preferred. These endless fibres, particularly preferably within the component (B1), are incorporated into the polyamide moulding compositions according to the invention by known methods for production of long-fibre-reinforced rod granulate (fibre length and granulate length are identical), in particular by pultrusion methods, in which the endless fibre strand (roving) is fully saturated with the polymer melt and is then cooled and cut. The long-fibre-reinforced rod granulate obtained in this manner, which preferably has a granulate length from 3 to 25 mm, in particular from 4 to 12 mm, can be further processed by means of the conventional processing methods (such as injection moulding, pressing) to form moulded parts. Endless fibres (long glass fibres) can also be combined with cut fibres (short glass fibres) in order to reinforce the moulding compositions according to the invention.

Fillers known to a person skilled in the art in this function can be considered as particulate fillers of the component (B2). These include, in particular, particulate fillers selected from the group consisting of: talc, mica, silicates, quartz, wollastonite, kaolin, silicic acids, magnesium carbonate, magnesium hydroxide, chalk, ground or precipitated calcium carbonate, lime, feldspar, inorganic pigments, such as, iron oxide, iron manganese oxide, metal oxides, in particular spinels, such as copper iron spinel, copper chromium oxide, zinc iron oxide, cobalt chromium oxide, cobalt aluminium oxide, magnesium aluminium oxide, copper/chromium/manganese mixed oxides, copper/manganese/iron mixed oxides, nickel antimony titanate, chromium antimony titanate, hard-magnetic or soft-magnetic metals or alloys or ceramics, hollow-spherical silicate fillers, aluminium oxide, boron nitride, boron carbide, aluminium nitride, calcium fluoride, and mixtures thereof. The fillers may also be surface-treated.

The component (B2) and/or also the component (X) preferably has a mean particle size (D50) in the range of 0.1-40 µm, preferably in the range of 0.2-20 µm, in particular in the range of 0.3-10 µm. A form of the particulate fillers with which the aspect ratios L/b1 and L/b2 are both at most 10, in particular at most 5, is preferred, wherein the aspect ratios are described by the quotients from the greatest length L of the particle to the average breadth b1 or b2 thereof. Here, b1 and b2, which are arranged perpendicularly with respect to one another, lie in a plane perpendicular with respect to the length L.

Furthermore, the component (B2) preferably has an absorption coefficient different from zero for UV, VIS or IR radiation, in particular for laser radiation, preferably with a wavelength in the region of 1064 nm, preferably with an absorption capacity in the visible and/or infrared radiation range with an absorption coefficient of at least 0.05, preferably at least 0.1, and particularly preferably at least 0.2.

The polyamide moulding compositions can be mixed with further polymers different from component (A), in particular impact toughness modifiers, in an amount from 0 to 30% by weight.

The polymers different from (A) (component C), which may likewise be provided in the form of a mixture with the polyamide constituent (A), is preferably selected from the group consisting of: polycarbonate, polystyrene, polymethyl methacrylate, acrylonitrile butadiene styrene copolymer, acrylonitrile styrene copolymer, polyolefin, polyoxymethylene, polyester, in particular polyethylene terephthalate, polybutylene terephthalate, polysulfone (in particular of the PSU, PESU, PPSU type), polyphenylene ether, polyphenylene sulphide, polyphenylene oxide, liquid-crystalline polymers, polyether ketone, polyether ether ketone, polyimide, aliphatic polyamide, polyamide imide, polyester imide, polyether amide, polyester amide, polyether ester amide, polyurethane (in particular of the TPU, PUR type), polysiloxane, polyacrylate, polymethacrylate and mixtures or copolymers based on such systems.

In a preferred embodiment, the moulding compositions can be mixed with up to 30% by weight of aliphatic polyamides within the scope of component (C). The content of aliphatic polyamides relative to the total moulding composition is preferably at most 20, in particular at most 10% by weight, wherein the aliphatic polyamides are preferably contained in the moulding composition in a range of 2-10% by weight. In particular, it is preferred if the moulding compositions are free from aliphatic polyamides. Polyamide 46, polyamide 6, polyamide 66, polyamide 11, polyamide 12, polyamide 1212, polyamide 1010, polyamide 1011, polyamide 1012, polyamide 1112, polyamide 1211, polyamide 610, polyamide 612, polyamide 69, polyamide 810, or mixtures, blends, or alloys thereof are preferred as aliphatic polyamides.

In a further embodiment, the moulding composition according to the invention contains up to 30% by weight, based on the total moulding composition, of one or more impact toughness modifiers (ITMs) as component (C). An ITM concentration in the range between 5 and 30% by weight, in particular of 7-25% by weight, is preferred. The impact toughness modifier may be a natural rubber, polybutadiene, polyisoprene, polyisobutylene, a mixed polymer of butadiene and/or isoprene with styrene or styrene derivatives and other comonomers, a hydrogenated mixed polymer and/or a mixed polymer that is produced by grafting or copolymerisation with acid anhydrides, (meth)acrylic acid and esters thereof. The impact toughness modifier (C) may also be a grafted rubber with a cross-linked elastomer core, which consists of butadiene, isoprene or alkyl acrylates and has a graft sleeve formed from polystyrene, a nonpolar or polar olefin homopolymer and copolymer, such as ethylene propylene rubber, ethylene propylene diene rubber and ethylene octene rubber or ethylene vinyl acetate rubber, or a nonpolar or polar olefin homopolymer and copolymer, which is produced by grafting or copolymerisation with acid anhydrides, (meth)acrylic acid and esters thereof. The impact toughness modifier (C) may also be a carboxylic-acid-functionalised copolymer, such as poly(ethene-co-(meth)acrylic acid) or poly(ethene-co-1-olefin-co-(meth)acrylic acid), wherein the 1-olefin may be an alkene or an unsaturated (meth)acrylic acid ester with more than 4 atoms, including those copolymers in which the acid groups are neutralised in part with metal ions.

Examples of the block copolymers based on styrene include styrene(ethylene-butylene) two-block copolymers and styrene-(ethylene-butylene)-styrene three-block copolymers.

In accordance with a further preferred embodiment, the moulding compositions according to the invention are characterised in that the component (C) contains a polyolefin homopolymer or an ethylene-α-olefin-copolymer, particularly preferably an EP and/or EPDM elastomer (ethylene propylene rubber or ethylene propylene diene rubber). For example, this may be an elastomer based on an ethylene-C3-12-α-olefin copolymer with 20 to 96, preferably 25 to 85% by weight of ethylene, wherein the C3-12-α-olefin is particularly preferably an olefin selected from the group propene, 1-butene, 1-pentene, 1-hexene, 1-octene, 1-decene and/or 1-dodecene, and the component (C) is particularly preferably ethylene propylene rubber and/or LLDPE and/or VLDPE.

Alternatively or additionally (for example in mixture), (C) may contain a terpolymer based on ethylene-C3-12-α-olefin with an unconjugated diene, wherein this preferably contains 25 to 85% by weight of ethylene and at most approximately 10% by weight of an unconjugated diene, wherein the C3-12-α-olefin is particularly preferably an olefin selected from the group propene, 1-butene, 1-pentene, 1-hexene, 1-octene, 1-decene and/or 1-dodecene and/or wherein the unconjugated diene is preferably selected from the group bicyclo(2.2.1) heptadiene, hexadiene-1.4, dicyclopentadiene and/or in particular 5-ethylidene norbornene.

In addition, ethylene acrylate copolymers or ethylene butylene acrylate copolymers are possible constituents for the component (C).

The component (C) preferably has constituents comprising carboxylic acid groups or carboxylic acid anhydride groups, which are introduced by thermal or radical reaction of the primary chain polymer with an unsaturated dicarboxylic acid anhydride, an unsaturated dicarboxylic acid or an unsaturated dicarboxylic acid mono alkyl ester in a concentration sufficient for good bonding to the polyamide, wherein, for this purpose, reagents selected from the following group are preferably used: maleic acid, maleic acid anhydride, maleic acid mono butyl ester, fumaric acid, aconitic acid and/or itaconic acid anhydride.

0.1 to 4.0% by weight of an unsaturated anhydride are preferably grafted onto the impact toughness component as a constituent of (C), or the unsaturated dicarboxylic acid anhydride or the precursor thereof is grafted on together with a further unsaturated monomer. The grafting degree is generally preferably in a range of 0.1-1.0%, particularly preferably in a range of 0.3-0.7%. A mixture of an ethylene propylene copolymer and an ethylene butylene copolymer, with a maleic acid anhydride grafting degree (MAH grafting degree) in the range of 0.3-0.7%, is also a possible constituent of component (C). The above-specified possible systems for the component may also be used in mixtures.

The ITMs used as component (C) therefore include homopolymers or copolymers of olefins, such as ethylene, propylene, butene-1, or copolymers of olefins and copolymerisable monomers, such as vinyl acetate, (meth)acrylic acid ester and methylhexadiene.

Examples of crystalline olefin polymers are low-density, medium-density and high-density polyethylenes, polypropylene, polybutadiene, poly-4-methylpentene, ethylene propylene block copolymers or statistical copolymers, ethylene methylhexadiene copolymers, propylene methylhexadiene copolymers, ethylene propylene butene copolymers, ethylene propylene hexene copolymers, ethylene propylene methylhexadiene copolymers, poly(ethylene vinyl acetate) (EVA), poly(ethylene ethyl acrylate) (EEA), ethylene octene copolymer, ethylene butene copolymer, ethylene hexene copolymer, ethylene propylene diene terpolymers, and combinations of the aforementioned polymers.

Examples of commercially obtainable impact toughness modifiers, which can be used within the scope of the constituents of component (C), are: TAFMER MC201: g-MAH (~0.6%) blend of 67% EP copolymer (20 mol % propylene)+33% EB copolymer (15 mol % butene-1)); TAFMER MH5010: g-MAH (0.6%) ethylene butylene copolymer; TAFMER MH7010: g-MAH (0.7%) ethylene butylene copolymer; Mitsui. TAFMER MH7020: g-MAH (0.7%) EP copolymer by Mitsui Chemicals; EXXELOR VA1801: g-MAH (0.7%) EP copolymer; EXXELOR VA1803: g-MAH (0.5-0.9%) EP copolymer, amorph; EXXELOR VA1810: g-MAH (0.5%) EP copolymer; EXXELOR MDEX 94-1 1: g-MAH (0.7%) EPDM, Exxon Mobile Chemical; FUSABOND MN493D: g-MAH (0.5%) ethylene octene copolymer; FUSABOND A EB560D (g-MAH) ethylene n butyl acrylate copolymer; ELVALOY, DuPont; Kraton FG1901GT: g-MAH (1.7%) SEBS with an S to EB ratio of 30:70; Lotader AX8840: ethylene glycidyl methacrylate copolymer.

An ionomer within the scope of component (A2) is also preferred, in which the polymer-bonded carboxyl groups are interconnected completely or partially by metal ions.

Mixed polymers of butadiene with styrene, functionalised by grafting with maleic acid anhydride, nonpolar or polar olefin homopolymers and copolymers, which are produced by grafting with maleic acid anhydride, and carboxylic-acid-functionalised copolymers such as poly(ethene-co-(meth) acrylic acid) or poly(ethene-co-1-olefin-co-(meth)acrylic acid), in which the acid groups are neutralised in part with metal ions, are particularly preferred.

In a further embodiment, the moulding compositions contain 0-25% by weight, preferably 5-25% by weight, particularly preferably 8-22% by weight of flame retardants, in particular halogen-free flame retardants, as component (D). Preferred flame retardants are phosphonates, alkyl phosphonates, cyclic phosphonates and phosphinates. Here, the flame retardant preferably comprises 60-100% by weight, preferably 70-98% by weight, in particular 80-96% by weight of a straight-chain or cyclic phosphonate, phosphinic acid salt and/or diphosphinic acid salt (component (D1)) and 0-40% by weight, preferably 2-30% by weight, in particular 4-20% by weight of a melamine polyphosphate or other synergists and/or of a flame retardant containing nitrogen and phosphorous (component (D2)), such as melem, melam, melon, or reaction products of melamine with polyphosphoric acid or reaction products of condensation products of melamine with polyphosphoric acid. Aluminium ions, calcium ions and zinc ions are preferably used as a metal ion of the phosphinic acid salts or diphosphinic acid salts. Flame retardants of this type are known from the prior art. Reference is made in this regard to DE 103 46 3261. Preferred synergists (component D2) are: barium carboxylate, oxygenous, nitrogenous or sulphurous metal compounds, in particular of the metals aluminium, calcium, magnesium, barium, sodium, potassium and zinc. Suitable compounds are selected from the group of oxides, hydroxides, carbonates, silicates, borates, phosphates, stannates and combinations or mixtures of these compounds, such as oxide hydroxides or oxide hydroxide carbonates. Examples include magnesium oxide, calcium oxide, aluminium oxide, zinc oxide, barium carbonate, magnesium hydroxide, aluminium hydroxide, boehmite, dihydrotalcite, hydrocalumite, calcium hydroxide, tin oxide hydrate, zinc hydroxide, zinc borate, zinc sulphide, zinc phosphate, sodium carbonate, calcium carbonate, calcium phosphate, magnesium carbonate, alkaline zinc silicate, zinc stannate. Systems such as calcium stearate, zinc stearate, magnesium stearate, potassium palmitate, magnesium behenate are also possible. Specific examples of such flame retardants include: Exolit 1230 (Clariant), Exolit 1312 (Clariant), Aflammit PLF 710 (Thor). Amgard CU (Rhodia). Of course, the thermoplastic polyamide moulding compositions according to the invention may also contain conventional additives known generally to a person skilled in the art in the form of component (E), which are preferably selected from the group consisting of stabilisers, anti-ageing agents, antioxidants, antiozonants, light stabilisers, UV stabilisers, UV absorbers, UV blockers, inorganic heat stabilisers, in particular based on copper halides and alkali halides, organic heat stabilisers, conductive additives, carbon black, optical brighteners, processing aids, nucleation agents, crystallisation accelerators, crystallisation retarders, flow aids, lubricants, release agents, plasticisers, pigments (different from white pigments), dyestuffs, markers and mixtures thereof.

Further embodiments are specified in the dependent claims.

DESCRIPTION OF PREFERRED EMBODIMENTS

The invention will be described hereinafter with use of specific exemplary embodiments (B) and compared with the less efficient systems according to the prior art (VB). The exemplary embodiments specified below are intended to support the invention and to demonstrate the differences from the prior art, but are not intended to limit the general subject matter of the invention, as is defined in the claims.

Examples B1 to B24 and Comparative Examples VB1 to VB7

The components specified in Tables 2 to 8 were compounded in a twin-screw extruder by Werner and Pfleiderer having a screw diameter of 25 mm under predefined process parameters (see Table 1), wherein the polyamide granulate and the additives are metered into the feed zone, whereas the glass fibre is metered into the polymer melt via a side feeder, 3 housing units before the die. The temperature profile 1 was used for examples VB1, VB3, VB6, B1, B2, B3, B4, B5, B6, B7, B8, B9, B10, B11, B12, B13, B17, B18 and B20-B24, and the temperature profile 2 was used for the examples VB2, VB4, VB5, VB7 and B14, B15, B16 and B19. The compositions summarised in the Tables 4 to 8 were removed in the form of a strand from a die with 2.5 mm diameter and were granulated after water cooling. The granulate was dried for 24 hours at 110° C. under vacuum of 30 mbar.

TABLE 1

Process parameters for compounding

| Parameter [unit] | Temperature profile 1 | Temperature profile 2 |
| --- | --- | --- |
| temperature zone 1 [° C.] | 70-90 | 80-100 |
| temperature zone 2 [° C.] | 190-210 | 290-310 |
| temperature zones 3 to 10 [° C.] | 270-290 | 320-340 |
| temperature zone 11 [° C.] | 270-290 | 310-330 |
| temperature zone 12 [° C.] | 270-290 | 310-330 |
| temperature of the die head [° C.] | 275-295 | 320-340 |
| melting point [° C.] | 280-300 | 320-340 |
| throughput [kg/h] | 8-12 | 8-12 |
| screw rotational speed [rpm] | 150-200 | 150-200 |

The compositions were injection moulded using an Arburg Allrounder 320-210-750 injection moulding machine at a defined compound temperature and a defined mould temperature (see Table 2) to form test specimens.

TABLE 2

Compound and mould temperature during injection mould processing

| Example | Mould temperature [° C.] | Compound temperature [° C.] |
| --- | --- | --- |
| VB1 | 40 | 250 |
| B1, B2, VB4 | 80 | 280 |
| B16, B4, B21-B24 | 80 | 300 |
| B6 | 40 | 260 |
| VB3 | 40 | 275 |
| B3, B15, B17, B19 | 85 | 275 |

TABLE 2-continued

Compound and mould temperature during injection mould processing

| Example | Mould temperature [° C.] | Compound temperature [° C.] |
| --- | --- | --- |
| B7, B8, B9, B13 | 85 | 290 |
| VB6 | 60 | 270 |
| B18, VB5, B5, B10, B11, B12, B14 | 100 | 300 |
| VB2 | 120 | 330 |
| VB7 | 130 | 330 |

TABLE 3

Influence of the staining method (staining medium: Maybelline Colour Sensational Cream Gloss Fabulous Pink 137) on $\Delta L^*$ and $\Delta E$ on the basis of examples B2 and B16 and comparative examples VB3 and VB7

| Staining method concentration of the staining medium; | B2 | | B17 | | VB3 | | VB7 | |
| --- | --- | --- | --- | --- | --- | --- | --- | --- |
| storage period | $\Delta L^*$ | $\Delta E$ | $\Delta L^*$ | $\Delta E$ | $\Delta L^*$ | $\Delta E$ | $\Delta L^*$ | $\Delta E$ |
| Method A | | | | | | | | |
| 100% (without sebum); 72 h (65° C./ 90% RH) | −0.4 | 1.1 | −0.4 | 0.89 | −3.8 | 33 | −2.6 | 7.7 |
| Method B | | | | | | | | |
| 100% (without sebum); 24 h (65° C./ 90% RH) | | 0.53 | | 0.41 | | 26 | | 5.2 |
| Method C | | | | | | | | |
| 25% in sebum; 24 h (65° C./ 90% RH) | | 0.18 | | 0.17 | | 17 | | 3.1 |

As can be seen from Table 3, the colour brightness difference $\Delta L^*$ and the colour difference $\Delta E$ is reduced by the dilution of the staining medium with sebum, independently of the underlying moulding composition. The values for $\Delta L^*$ and $\Delta E$ increase considerably with extension of the storage period from 24 h to 72 h, and the $\Delta E$ value measured after 24 h has more than doubled in some cases. In all three staining tests of the articles from example B2 and B16, there is a staining tendency ST=1, yet the $\Delta E$ increases by a factor of 5 or 6 if, instead of method C, the staining method A is selected. In comparative example VB7, a staining tendency ST=2 results with the staining method C, and a staining tendency ST=3 results with method A. Due to the more intensive staining, all further described staining tests were carried out with method A, that is to say no sebum was used to dilute the staining medium and the samples were stored for 72 hours at 65° C. and a relative humidity of 90%.

TABLE 4

Composition, staining tendency (ST), ΔL* and ΔE (determined with staining method A) of comparative examples VB1 to VB7

| | Unit | VB1 | VB2 | VB3 | VB4 | VB5 | VB6 | VB7 |
|---|---|---|---|---|---|---|---|---|
| | | Composition | | | | | | |
| PA12 | % by weight | 96.15 | | | | | 35 | |
| 6T/66 (60:40) | % by weight | | 62.5 | | | | | |
| MXD6 | % by weight | | | 96.15 | | | | |
| 6T/6I (33:67) | % by weight | | | | 96.15 | | | |
| 10T/612 (80:20) | % by weight | | | | | 96.15 | | |
| 10T/6T (85:15) | % by weight | | | | | | | 50 |
| MACM12 | % by weight | | | | | | 15 | |
| heat stabiliser | % by weight | | 0.5 | | | | | |
| zinc sulphide | % by weight | 3.85 | | 3.85 | 3.85 | 3.85 | | |
| titanium dioxide | % by weight | | 15 | | | | | 20 |
| calcium carbonate | % by weight | | | | | | | 20 |
| glass fibres A | % by weight | | 22 | | | | 50 | 10 |
| | | Staining tendency | | | | | | |
| ΔL mustard | | −2.2 | −3.9 | −13.2 | −3.8 | −0.8 | −2.0 | −1.0 |
| ΔL lipstick | | −5.3 | −12.8 | −3.8 | −6.5 | −3.9 | −3.3 | −2.6 |
| ΔE mustard | | 50 | 29 | 44 | 33 | 21 | 39 | 11 |
| ΔE lipgloss | | 30 | 47 | 33 | 21 | 16 | 14 | 7.7 |
| ST (mustard, lipgloss) | | 4 | 4 | 4 | 4 | 4 | 4 | 3 |
| | | Mechanical properties (dry state) | | | | | | |
| tensile modulus of elasticity | MPa | 1600 | | 4000 | 2800 | | 14000 | 7300 |
| tear strength | MPa | 50 | | 57 | 71 | | 170 | 85 |
| elongation at tear | % | >50 | | 30 | 137 | | 2.6 | 1.4 |
| impact toughness 23° C. | kJ/m$^2$ | n.b. | | 50 | | | 90 | 32 |
| notch toughness 23° C. | kJ/m$^2$ | n.b. | | 4 | | | 20 | 4 |
| linear mould shrinkage long. | % | 0.80 | 0.15 | | | 0.65 | | |
| linear mould shrinkage trans. | % | 0.90 | 0.80 | | | 1.10 | | |
| warping | % | 0.10 | 0.65 | | | 0.45 | | | n.b. = no break;
warping = |linear mould shrinkage trans. − linear mould shrinkage long.|

TABLE 5

Composition, staining tendency (ST), ΔL* and ΔE (determined with staining method A) of examples B1 to B6

| | Unit | B1 | B2 | B3 | B4 | B5 | B6 |
|---|---|---|---|---|---|---|---|
| | | Composition | | | | | |
| MACM12 | % by weight | 100 | 96.15 | 47.8 | | | |
| MACMI/12 | % by weight | | | | 96.15 | | |
| MACMT/MACMI/12 | % by weight | | | | | 96.15 | |
| MACM10 | % by weight | | | | | | 96.15 |
| heat stabiliser | % by weight | | | 0.35 | | | |
| zinc sulphide | % by weight | | 3.85 | 3.85 | 3.85 | 3.85 | 3.85 |
| glass fibres C | % by weight | | | 48 | | | |

TABLE 5-continued

Composition, staining tendency (ST), ΔL* and ΔE (determined with staining method A) of examples B1 to B6

|  | Unit | B1 | B2 | B3 | B4 | B5 | B6 |
|---|---|---|---|---|---|---|---|
| Staining tendency (dry state) | | | | | | | |
| ΔL mustard | | −0.4 | −0.2 | −0.2 | +/−0.0 | −0.2 | −0.4 |
| ΔL lipstick | | −0.7 | −0.4 | −0.7 | −0.3 | −0.5 | −0.2 |
| ΔE mustard | | 1.3 | 3.1 | 3.5 | 0.6 | 0.7 | 2.5 |
| ΔE lipgloss | | 0.8 | 1.1 | 1.9 | 0.5 | 0.5 | 1.2 |
| ST (mustard, lipgloss) | | 1 | 2 | 2 | 1 | 1 | 2 |
| Mechanical properties | | | | | | | |
| tensile modulus of elasticity | MPa | 1500 | | | 2300 | 2200 | |
| tear strength | MPa | 50 | | | 50 | 65 | |
| elongation at tear | % | 118 | | | >50 | >50 | |
| impact toughness 23° C. | kJ/m² | | | | n.b. | n.b. | |
| notch toughness 23° C. | kJ/m² | | | | 8 | 10 | |
| linear mould shrinkage long. | % | 0.60 | 0.55 | 0.03 | 0.58 | 0.58 | 0.57 |
| linear mould shrinkage trans. | % | 0.65 | 0.60 | 0.26 | 0.62 | 0.62 | 0.62 |
| warping | % | 0.05 | 0.05 | 0.23 | 0.04 | 0.04 | 0.05 | n.b. = no break;
warping = |linear mould shrinkage trans. − linear mould shrinkage long.|

TABLE 6

Composition, staining tendency (ST), ΔL* and ΔE (determined with staining method A) of examples B7 to B13

|  | Unit | B7 | B8 | B9 | B10 | B11 | B12 | B13 |
|---|---|---|---|---|---|---|---|---|
| Composition | | | | | | | | |
| MACMI/12 | % by weight | 66.85 | 47.65 | 37.95 | | | | |
| MACMT/MACMI/12 | % by weight | | | | 66.85 | 47.65 | 37.95 | |
| PACM12 | % by weight | | | | | | | 95.65 |
| heat stabiliser | % by weight | 0.5 | 0.5 | 0.5 | 0.5 | 0.5 | 0.5 | 0.5 |
| zinc sulphide | % by weight | 3.85 | 3.85 | 3.85 | 3.85 | 3.85 | 3.85 | 3.85 |
| glass fibres B | % by weight | 28.8 | 48.0 | 57.7 | 28.8 | 48.0 | 57.7 | |
| Staining tendency | | | | | | | | |
| ΔL mustard | | −0.7 | −0.3 | −0.4 | −0.4 | −0.4 | −0.3 | |
| ΔL lipstick | | −1.5 | −0.7 | −1.1 | −0.9 | −0.9 | −1.1 | |
| ΔE mustard | | 3.0 | 3.3 | 3.5 | 3.0 | 3.5 | 3.9 | 6.0 |
| ΔE lipgloss | | 2.8 | 2.8 | 2.9 | 2.8 | 2.6 | 3.2 | 1.4 |
| ST (mustard, lipgloss) | | 2 | 2 | 2 | 2 | 2 | 2 | |
| Mechanical properties (dry state) | | | | | | | | |
| tensile modulus of elasticity | MPa | 8600 | 15200 | 19800 | 9200 | 14500 | 19000 | 1430 |
| tear strength | MPa | 166 | 187 | 188 | 171 | 183 | 180 | 50 |
| elongation at tear | % | 3.4 | 1.9 | 1.4 | 3.0 | 1.9 | 1.3 | 130 |
| impact toughness 23° C. | kJ/m² | 61 | 43 | 33 | 60 | 42 | 26 | n.b. |
| notch toughness 23° C. | kJ/m² | 10 | 10 | 9 | 8 | 9 | 8 | 13 |
| linear mould shrinkage long. | % | 0.15 | 0.05 | 0.02 | 0.13 | 0.04 | 0.02 | 0.54 |
| linear mould shrinkage trans. | % | 0.45 | 0.30 | 0.22 | 0.42 | 0.26 | 0.20 | 0.65 |
| warping | % | 0.30 | 0.25 | 0.20 | 0.29 | 0.22 | 0.18 | 0.11 | n.b. = no break;
warping = |linear mould shrinkage trans. − linear mould shrinkage long.|

TABLE 7

Composition, staining tendency (ST) ΔL* and ΔE (determined with staining method A) of examples B14 to B20

| | Unit | B14 | B15 | B16 | B17 | B18 | B19 | B20 |
|---|---|---|---|---|---|---|---|---|
| Composition | | | | | | | | |
| MACMI/12 | % by weight | 53.45 | | | | | | |
| MACMT/MACMI/12 | % by weight | | 53.45 | | | | | |
| TMDC12 | % by weight | | | 53.45 | 96.15 | 66.85 | 75.65 | |
| MACM12/PACM12 | % by weight | | | | | | | 95.65 |
| 10T/612 (80:20) | % by weight | 13.4 | 13.4 | 13.4 | | | 20 | |
| heat stabiliser | % by weight | 0.5 | 0.5 | 0.5 | | 0.5 | 0.5 | 0.5 |
| zinc sulphide | % by weight | 3.85 | 3.85 | 3.85 | 3.85 | 3.85 | 3.85 | 3.85 |
| glass fibres B | % by weight | 28.8 | 28.8 | 28.8 | | 28.8 | | |
| Staining tendency | | | | | | | | |
| ΔL mustard | | +/−0.0 | −0.2 | −0.2 | −0.3 | −0.2 | +/−0.0 | |
| ΔL lipstick | | −0.7 | −0.6 | −0.6 | −0.4 | −0.5 | +/−0.0 | |
| ΔE mustard | | 3.3 | 2.6 | 3.3 | 1.5 | 2.9 | 3.0 | 5.8 |
| ΔE lipgloss | | 2.5 | 1.8 | 1.8 | 0.89 | 1.9 | 0.7 | 1.3 |
| ST (mustard, lipgloss) | | 2 | 2 | 2 | 1 | 2 | 2 | 2 |
| Mechanical properties (dry state) | | | | | | | | |
| tensile modulus of elasticity | MPa | 8700 | 9000 | 7500 | 1600 | 7200 | 1800 | 1460 |
| tear strength | MPa | 169 | 176 | 141 | 55 | 138 | 50 | 56 |
| elongation at tear | % | 3.6 | 3.2 | 3.2 | 104 | 4.0 | 19 | 140 |
| impact toughness 23° C. | kJ/m² | 81 | 66 | 63 | n.b. | 67 | n.b. | n.b. |
| notch toughness 23° C. | kJ/m² | 10 | 8 | 10 | 8 | 12 | 8 | 11 |
| linear mould shrinkage long. | % | 0.18 | 0.16 | 0.16 | 0.60 | 0.14 | 0.65 | 0.58 |
| linear mould shrinkage trans. | % | 0.55 | 0.50 | 0.48 | 0.62 | 0.42 | 0.75 | 0.65 |
| warping | % | 0.37 | 0.34 | 0.32 | 0.02 | 0.28 | 0.10 | 0.07 | n.b. = no break;
warping = |linear mould shrinkage trans. − linear mould shrinkage long.|

TABLE 8

Composition, staining tendency (ST) ΔL* and ΔE (determined with staining method A) and mechanical properties of examples B21 to B24

| | Unit | B21 | B22 | B23 | B24 |
|---|---|---|---|---|---|
| Composition | | | | | |
| MACMI/12 | % by weight | 85.5 | 87.2 | 78.5 | 52.0 |
| 10T/612 (80:20) | % by weight | | | | 13.6 |
| SZM KratonFG1901GT | % by weight | 12.0 | 12.0 | 10.0 | |
| Heat stabilizer | % by weight | 0.5 | 0.46 | 0.5 | 0.4 |
| Titaniumdioxide | % by weight | 2.0 | 0.04 | 11.0 | 4.0 |
| Carbon black | % by weight | | 0.30 | | |
| Glass fibres B | % by weight | | | | 30.0 |
| Staining tendency | | | | | |
| ΔL mustard | | −0.7 | −0.7 | −0.5 | +/−0.0 |
| ΔL lipstick | | −1.1 | −1.2 | −0.9 | −0.7 |
| ΔE mustard | | 3.6 | 3.6 | 3.1 | 3.3 |
| ΔE Lipgloss | | 2.2 | 2.3 | 1.9 | 2.5 |
| AN (mustard, Lipgloss) | | 2 | 2 | 2 | 2 |
| Mechanical properties (dry state) | | | | | |
| tensile modulus of elasticity | MPa | 1300 | 1400 | 1300 | 8800 |
| tear strength | MPa | 41 | 44 | 43 | 165 |
| elongation at tear | % | >100 | >100 | >100 | 3.4 |
| impact toughness 23° C. | kJ/m² | n.b. | n.b. | n.b. | 80 |
| notch toughness 23° C. | kJ/m² | 60 | 58 | 60 | 10 |
| linear mould shrinkage long. | % | 0.54 | 0.55 | 0.52 | 0.18 |
| linear mould shrinkage trans. | % | 0.62 | 0.60 | 0.58 | 0.54 |
| warping | % | 0.08 | 0.05 | 0.07 | 0.36 | n.b. = no break;
warping = |linear mould shrinkage trans. − linear mould shrinkage long.|

Key:
6T/6I (70:30) semi-crystalline polyamide based on TPS, IPS and HMDA, Tm=325° C., $\eta_{rel}$=1.58, ΔHm=55 J/g.
6T/66 (60:40) semi-crystalline polyamide based on TPS, ADS and HMDA, Tm=310° C., $\eta_{rel}$=1.60, ΔHm=60 J/g
10T/6T (85:15) semi-crystalline polyamide based on TPS, HMDA and DMDA, Tm=300° C., $\eta_{rel}$=1.68, ΔHm=58 J/g 10T/612 (80:20) semi-crystalline polyamide based on TPS, DDDS, HMDA and DMDA, Tm=256° C., $\eta_{rel}$=1.72, ΔHm=48 J/g PA 12 semi-crystalline polyamide based on LL, Tm=178° C., $\eta_{rel}$=1.96, ΔHm=57 J/g MXD6 semi-crystalline polyamide based on MXDA and ADS, Tm=240° C., $\eta_{rel}$=1.80, ΔHm=44 J/g MACM12 amorphous polyamide based on MACM and DDDS, Tg=156° C., $\eta_{rel}$=1.82, ΔHm<4 J/g, LT=93%.

MACM10 amorphous polyamide based on MACM, DDS, Tg=165° C., $\eta_{rel}$=1.75, ΔHm<4 J/g, LT=93%.

MACMI/12 (65:35) amorphous polyamide based on MACM, IPS and LL, Tg=154° C., $\eta_{rel}$=1.76, ΔHm<4 J/g, LT=92%

MACMT/MACMI/12 amorphous polyamide based on MACM, TPS, IPS and LL, (37:37:26) Tg=160° C., $\eta_{rel}$=1.70, ΔHm<4 J/g, LT=92%.

6T/6I (33:67) amorphous polyamide based on TPS, IPs and HMDA, Tg=125° C., $\eta_{rel}$=1.54, ΔHm<4 J/g.

TMDC12 amorphous polyamide based on TMDC, DDDS, Tg=170° C., $\eta_{rel}$=1.75, ΔHm<4 J/g, LT=92%.

PACM12 microcrystalline polyamide based on PACM and DDDS, Tm=251° C., Tg=140° C., $\eta_{rel}$=1.91, ΔHm=22 J/g, LT=91%.

MACM12/PACM12 microcrystalline polyamide based on MACM, PACM and (30:70) DDDS, Tm=238° C., Tg=147° C., $\eta_{rel}$=1.85, ΔHm=12 J/g, LT=91%.

glass fibre A cut glass fibres E10 Vetrotex 995 consisting of E glass, with a length of 4.5 mm and a diameter of 10 μm (circular cross section) by Owens Corning Fiberglass.

glass fibre B cut glass fibres Micromax 771 consisting of E glass, with a length of 4.5 mm and a diameter of 6 μm (circular cross section) by Owens Corning Fiberglas.

glass fibre C cut glass fibres CSG3PA-820 consisting of E glass, with a length of 3 mm and flat cross section of 7×28 μm by Nitto Boseki.

zinc sulphide Sachtolith HD-S (Sachtleben), mean particle size in the range from 0.30 to 0.35 μm.

titanium dioxide Table 4: Ti-Pure R-104 (DuPont), mean particle size in the region of 0.22 μm. Tabelle 8: Ti-Pure R-103 Titaniumdioxide (Rutile), DuPont, mean particle size in the range of 0.22 μm calcium carbonate Socal P3 (Solvay), mean particle size in the range of 0.18-0.50 μm.

Carbon black Black Pearls 880, Cabot.

Abbreviations Used:

TPS=terephthalic acid, IPS=isophthalic acid, ADS=adipic acid, DDS=1,10-decane diacid, DDDS=1,12-dodecane diacid, HMDA=1,6-hexanediamine, DMDA=1,10-decanediamine, MXDA=m-xylylenediamine, MACM=bis-(4-amino-3-methyl-cyclohexyl)-methane, PACM=bis-(4-amino-cyclohexyl)-methane, TMDC=bis-(4-amino-3,5-dimethyl-cyclohexyl)-methane, LL=laurolactam)

The ratios specified between brackets stand for molar ratios of the sub-units, therefore for example 10T/6T (85:15) means that 85 mol % of 10T units are present in addition to 15 mol % of 6T units, and MACMT/MACMI/12 (37:37:26) means that 37 mol % of MACMT units, 37 mol % of MACMI units, and 12 mol % of lactam 12 units (laurolactam) are provided.

The measurements were taken in accordance with the following standards and on the following test specimens.

The tensile modulus of elasticity was determined in accordance with ISO 527 with a strain rate of 1 mm/min, the yield stress, the tear strength and the elongation at tear were determined in accordance with ISO 527 with a strain rate of 50 mm/min (unreinforced variant) or a strain rate of 5 mm/min (reinforced variant) at a temperature 23° C., wherein an ISO tension bar was used as a test specimen, standard: ISO/CD 3167, A1 type, 170×20/10×4 mm.

Impact toughness and notch toughness were measured by Charpy in accordance with ISO 179 on an ISO test bar, standard: ISO/CD 3167, B1 type, 80×10×4 mm at 23° C.

The thermal behaviour (melting point (Tm), enthalpy of fusion (ΔHm), glass transition temperature (Tg)) was determined on the basis of ISO standard 11357-11-2 on the granulate. Differential scanning calorimetry (DSC) was carried out with a heating rate of 20° C./min. The temperature for the mid-stage or the turning point is specified for the glass transition temperature (Tg).

The relative viscosity ($\eta_{rel}$) was measured in accordance with DIN EN ISO 307 on the basis of 0.5% by weight of m-cresol solutions at 20° C. Granulate was used as a specimen. The processing shrinkage (linear mould shrinkage long./trans.) was determined in accordance with ISO 294-4 on a plate, D2 type, 60×60×2 mm (in accordance with standard ISO 294-3). The plates were produced with the composition and mould temperatures as specified in Table 1. They were stored before the measurement for 48 hours at room temperature over silica gel. The processing shrinkage was determined longitudinally and transversely to the flow direction based on the cavity size. The arithmetic mean value from the measurements on 5 plates is specified.

Determination of the Staining Tendency or the Stain Resistance

The following staining media lipgloss: Maybelline Colour Sensational Cream Gloss Fabulous Pink 137 (Maybelline New York, Jade Düsseldorf, Gemey-Paris, 16 Place Vendome, 75001 Paris) or mustard: Thomy scharfer (hot) mustard (Nestle Suisse AG, 1800 Vevey, Switzerland)

were applied in a planar manner using a cotton pad to test specimens measuring 2×40×50 mm in size (colour plates) and were stored for 24 or 72 hours in a climatic cabinet at 65° C. and a relative humidity of 90%. In some tests, a mixture of 1 part staining medium and 3 parts raw beef tallow (Bovinum sebum crudum, product no. 26-6240-01, batch 2010.11.0664, Hänseler AG, 9101 Herisau, Switzerland) was applied to the colour plates. The following staining methods were carried out:

Method A: the staining medium was used in a concentration of 100%, that is to say there was no dilution with sebum, and the samples were stored for 72 hours at 65° C. and a relative humidity of 90%.

Method B: the staining medium was used in a concentration of 100%, that is to say there was no dilution with sebum, and the samples were stored for 24 hours at 65° C. and a relative humidity of 90%.

Method C: the staining medium was mixed with sebum in a ratio of 1:3, that is to say the concentration of the staining medium in this mixture was 25% by weight, and the samples were stored for 24 hours at 65° C. and a relative humidity of 90%.

After storage, the colour plates were brought to 23° C. and then surface-cleaned under flowing, lukewarm water using a sponge provided with aqueous soap solution until the sample surface was free from adhering residues of the staining medium. The reference colour plates without staining media were likewise stored and subjected to the cleaning step.

After cleaning, the CIE L*a*b* values of reference and test colour plates were determined using a spectrophotometer by Datacolor (apparatus name: Datacolor 650) under the following measurement conditions against a contrast sheet painted white—measurement mode: reflection; measurement geometry: D/8°; light type: D6510; gloss: locked in; calibration: UV-calibrated; measuring diaphragm: SAV.

With use of the L*, a*, and b* values of reference and sample corresponding to the CIELAB system (DIN 6174), the colour brightness difference ΔL* was calculated as follows:

$$\Delta L^* = L_{sample}^* - L_{reference}^*$$

The colour difference ΔE between the colour locations $(L^*a^*b^*)_{reference}$ and $(L^*a^*b^*)_{sample}$ was calculated in accordance with ISO 12647 and ISO 13655 as a Euclidean difference as follows:

$$\Delta E = \sqrt{(L_{sample}^* - L_{reference}^*)^2 + (a_{sample}^* - a_{reference}^*)^2 + (b_{sample}^* - b_{reference}^*)^2}$$

The staining tendency (ST) in the described staining test was quantified by the change of the colour impression ΔE; it can be classified as follows:
ST=1: no staining or only very slight staining (0≤ΔE≤2)
ST=2: slight staining (2<ΔE≤6)
ST=3: considerable staining (6<ΔE≤12)
ST=4: heavy staining (corresponds to an ΔE>12)

Articles (moulded parts, components) according to the invention have a staining tendency of class 1 or 2, that is to say the ΔE value is 6 at most.

The colour plates used for the colorimetry measuring 2×40×50 mm in size were injection moulded from these materials on a fully electrical injection moulding machine from Arburg (apparatus name: ARBURG Allrounder 320 A 500-170) with temperature-controlled mould. The injection moulding parameters are specified in Table 1.

Light transmission (LT, transparency) and Haze were determined in accordance with ASTM D 1003 on plates measuring 2×60×60 mm in size or on round plates 2×70 mm at a temperature of 23° C. using the Haze Gard Plus measuring device by Byk Gardner with the CIE light type C. The light transmission values are specified in % of the quantity of irradiated light.

The invention claimed is:

1. A method for the production of a stain-resistant article, a staining tendency (ST) of the article being 1 or 2, wherein the method includes the following steps:
preparing a polyamide moulding composition consisting of:
(A) 30-99.5% by weight of a polyamide or a polyamide mixture, consisting of:
(A1) 50-100% by weight of at least one amorphous and/or microcrystalline polyamide having a glass transition temperature of at least 100° C., measured according to ISO-norm 11357-11-2,
wherein amorphous polyamides of the polyamide (A1) have heats of fusion of at most 4 J/g, and microcrystalline polyamides of the polyamide (A1) have heats of fusion in the range of 4-25 J/g, in each case determined according to ISO 11357-11-2 on granulate, differential scanning calorimetry (DSC) with a heating rate of 20° C./min, based on:
(a1) 20-100 mol % of at least one cycloaliphatic diamine; and 0-80 mol % of at least one other aliphatic and/or aromatic diamine,
wherein the mol % within component (a1) complement to 100 mol %; and
(a2) aromatic and/or aliphatic dicarboxylic acids comprising at least 6 carbon atoms,
with the proviso that up to 45 mol % of the totality of monomers of components (a1) and (a2) can be replaced by lactams comprising 6 to 12 carbon atoms or amino carboxylic acids comprising 6 to 12 carbon atoms,
(A2) 0-50% by weight of at least one semi-aromatic polyamide different from (A1);
wherein both (A1) and (A2) are present in the composition and together form 100% of component (A);
(X) 0.5-10% by weight of one or several inorganic white pigments having an average particle size (D50) in the range of 0.1-40 μm, selected from the group consisting of barium sulphate, zinc oxide, zink sulphide, lithopone and titanium dioxide, in the rutile or anatase modification, titanium-zinc mixed oxides, and mixtures thereof;
(B) 0-70% by weight of fibrous fillers (B1) and/or particulate fillers (B2) with the exception of inorganic white pigments;
(C) 0-30% by weight of polymers different from (A);
(D) 0-25% by weight of a flame retardant; and
(E) 0-3% by weight of additives,
wherein the sum of the constituents (A)-(E) including (X) makes up 100% by weight
and;
injection moulding or extruding said polyamide moulding composition to form at least part of said stain-resistant article,
wherein the staining tendency (ST) is determined by a colour impression ΔE and is classified as follows:
ST=1: 0≤ΔE≤2
ST=2: 2<ΔE≤6
ST=3: 6<ΔE≤12
ST=4: ΔE>12,
the colour impression ΔE is calculated in accordance with ISO 12647 and ISO 13655 as follows:

$$\Delta E = \sqrt{(L_{sample}^* - L_{reference}^*)^2 + (a_{sample}^* - a_{reference}^*)^2 + (b_{sample}^* - b_{reference}^*)^2}.$$

2. The method according to claim 1, wherein the polyamide of component (A1) has a glass transition temperature of at least 130° C. and/or wherein amorphous polyamides of the polyamide (A1) have a heat of fusion of at most 2 J/g, determined in accordance with ISO 11357-11-2 on the granulate, with use of differential scanning calorimetry (DSC) with a heating rate of 20° C./min,
and/or wherein microcrystalline polyamides of component (A1) have a heat of fusion in the range of 8-22 J/g, determined in accordance with ISO 11357-11-2 on the granulate, differential scanning calorimetry (DSC) with a heating rate of 20° C./min.

3. The method according to claim 1, wherein the E value (colour location) determined in the CIELAB colour space in accordance with EN ISO 11664-4 is changed by a staining test by a ΔE value of at most 6, and/or wherein the articles have a luminance L* of >80, both before and after the staining.

4. The method according to claim 1, wherein the proportion of (a1) within the component (A1) is formed from 40-100 mol % of at least one cycloaliphatic diamine; and 0-60 mol % of at least one other aliphatic and/or aromatic diamine.

5. The method according to claim 1, wherein the component (A1) is free from terephthalic acid and/or isophthalic acid,
or wherein, if component (A1) contains terephthalic acid and/or isophthalic acid within the scope of (a2), or if (a2) is formed substantially by terephthalic acid and/or isophthalic acid, 10-40 mol % of the totality of monomers in components (a1) and (a2) are replaced by lactams comprising 6 to 12 carbon atoms or amino carboxylic acids comprising 6 to 12 carbon atoms.

6. The method according to claim 1, wherein the proportion of terephthalic acid within component (A1) is at most 50 mol %, based on the sum of all dicarboxylic acids of component (A1).

7. The method according to claim 1, wherein the component (A2) is formed from aromatic dicarboxylic acids selected from the group consisting of terephthalic acid, naphthalene dicarboxylic acid and isophthalic acid, and mixtures thereof, and/or from dicarboxylic acids selected from the group consisting of adipic acid, suberic acid, azelaic acid, sebacic acid, undecane diacid, dodecane diacid, tridecane diacid, tetradecane diacid, pentadecane diacid, hexadecane diacid, heptadecane diacid, octadecane diacid, C36-dimer fatty acid, cis- and/or trans-cyclohexane-1,4-dicarboxylic acid and/or cis- and/or trans-cyclohexane-1,3-dicarboxylic acid (CHDA) and mixtures thereof, and is also formed from diamines selected from the group consisting of 1,4-butanediamine, 1,5-pentanediamine, 2-methyl-1,5-pentanediamine, 2-butyl-2-ethyl-1,5-pentanediamine, 1,6-hexanediamine, 2,2,4-trimethylhexamethylenediamine, 2,4,4-trimethylhexamethylenediamine, 1,8-octanediamine, 2-methyl-1,8-octanediamine, 1,9-nonanediamine, 1,10-decanediamine, 1,11-undecanediamine, 1,12-dodecanediamine, 1,13-tridecanediamine, 1,14-tetradecanediamine, m-xylylenediamine and p-xylylenediamine, wherein the polyamides (A2) contain lactams or amino carboxylic acids, selected from the group consisting of α,ω-amino acids or lactams comprising 6 to 12 carbon atoms.

8. The method according to claim 1, wherein the component (A) consists of one or more polyamides (A1),
or wherein the component (A) consists of a mixture of one or more polyamides (A1) with semi-aromatic polyamides (A2), wherein the component (A2) in this mixture makes up at most 50% by weight.

9. The method according to claim 1, wherein the proportion of component (A) lies in the range of 30-90% by weight, wherein the proportion of component (B) lies in the range of 10-65% by weight,
wherein the proportion of component (C) lies in the range of 1-25% by weight, wherein the proportion of component (D) lies in the range of 5-25% by weight, and wherein
the proportion of component (E) lies in the range from 0.1-2% by weight.

10. The method according to claim 1 as part of an electrical or electronic component, as part of a casing or a casing component, casings or casing parts for portable electronic devices, domestic devices, domestic machines, devices and apparatuses for telecommunications and consumer electronics, inner and outer parts in the automotive sector and in the field of other transport means, inner and outer parts, with or without a supporting or mechanical function in the field of electrical engineering, furniture, sport, mechanical engineering, sanitation and hygiene, medicine, power engineering and drive technology, mobile telephones, Smartphones, organisers, laptop computers, notebook computers, tablet computers, radios, cameras, watches, calculators, music or video players, navigation devices, GPS devices, electronic picture frames, external hard drives and other electronic storage media, or for the production of yarns, fibres, bi-component fibres, staple fibres, crimped and/or textured and/or cut to a length of 30-140 mm, filaments and monofilaments.

11. The method according to claim 1, wherein the inorganic white pigments of the component (X) are present in the composition in a proportion in the range of 2-7% by weight.

12. The method according to claim 1, wherein the inorganic white pigments have an average particle size (D50) in the range of 0.1-10 μm.

13. The method according to claim 1, wherein the polyamide of component (A1) has a glass transition temperature of at least 150° C. and no more than 200° C.

14. The method according to claim 1, wherein the E value (colour location) determined in the CIELAB colour space in accordance with EN ISO 11664-4 is changed by a staining test by a ΔE value of at most 4, and/or wherein the articles have a luminance L* of >95, both before and after the staining, wherein the value of a* or, independently thereof, the value of b* alternatively or additionally is <3, or in the range of 0 in each case.

15. The method according to claim 1, wherein no more than 5 mol % of the cycloaliphatic diamines within (a1) are replaced within the component (A1) by other aliphatic and/or aromatic diamines, or wherein the component (A1) is substantially free from such further, different non-cycloaliphatic diamines.

16. The method according to claim 1, wherein the at least one aromatic and/or aliphatic dicarboxylic acid comprising at least 6 carbon atoms (a2) of component (A1) is selected from the group consisting of isophthalic acid alone, a mixture of isophthalic acid and terephthalic acid, in a molar ratio from 40/60 to 60/40, and aliphatic unbranched C10-C14 dicarboxylic acid.

17. The method according to claim 1, wherein the component (A1) is free from terephthalic acid and/or isophthalic acid, and the proportion of lactam and/or amino carboxylic acid is furthermore substantially zero,
or wherein, if component (A1) contains terephthalic acid and/or isophthalic acid within the scope of (a2), or if (a2) is formed substantially by terephthalic acid and/or isophthalic acid, 20-35 mol % of the totality of monomers in components (a1) and (a2) are replaced by lactams 10 or 12 carbon atoms or amino carboxylic acids comprising 6 to 12 carbon atoms.

18. The method according to claim 1, wherein the proportion of terephthalic acid within component (A1) is at most 50 mol %, based on the sum of all dicarboxylic acids of component (A1), wherein the proportion of terephthalic acid in component A1 is less than 45 mol % or no terephthalic acid is contained in component (A1).

19. The method according to claim 1, wherein the component (A2) is formed from aromatic dicarboxylic acids, selected from the group consisting of terephthalic acid, naphthalene dicarboxylic acid, isophthalic acid and mixtures thereof, and/or from dicarboxylic acids selected from the group consisting of adipic acid, suberic acid, azelaic acid, sebacic acid, undecane diacid, dodecane diacid, tridecane diacid, tetradecane diacid, pentadecane diacid, hexadecane diacid, heptadecane diacid, octadecane diacid, C36-dimer fatty acid, cis- and/or trans-cyclohexane-1,4-dicarboxylic acid and/or cis- and/or trans-cyclohexane-1,3-dicarboxylic acid (CHDA) and mixtures thereof, and wherein the proportion of terephthalic acid in the total volume of dicarboxylic acids of component (A2) lie in the range from 65 to 95 mol %, and is also formed from diamines, specifically selected from the group consisting of 1,6-hexanediamine, 1,10-decanediamine and 1,12-dodecanediamine, wherein the polyamides (A2) contain lactams or amino carboxylic acids, selected from the group consisting of caprolactam, α,ω-aminocaproic acid, laurolactam, α,ω-aminoundecanoic acid and α,ω-aminododecanoic acid.

20. The method according to claim 1, wherein the component (A) consists of a mixture of one or more polyamides (A1) with semi-aromatic polyamides (A2), wherein the component (A2) in this mixture makes up at most 35% by weight, based on the polyamide mixture A.

21. The method according to claim 1, wherein the proportion of component (A) lies in the range of 30-80% by weight,
wherein the proportion of component (B) lies in the range of 20-60% by weight,
wherein the proportion of component (C) lies in the range of 2-15% by weight,
wherein the proportion of component (D) lies in the range of 5-20% by weight, and wherein
the proportion of component (E) lies in the range from 0.2-1.5% by weight.

22. The method according to claim 1, wherein the component (A1) is formed by a system selected from the group consisting of MACM12, MACMI/12, TMDC12, MACMT/MACMI/12, and a mixture thereof;
and (A2) is simultaneously selected as 6T/6I, wherein the molar ratio lies in the range from 65:35 to 75:25,
and/or (A2) is simultaneously selected as 10T/6T, 12T/6T, 10T/11, 10T/12, 10T/1010, 10T/1012, 10T/106, 10T/126, and/or 10T/612 and/or 3-6T, wherein the molar ratio lies in the range from 70:30 to 90:10,
wherein the proportion of (A1) makes up 50-95% by weight.

23. The method according to claim 1, wherein the inorganic white pigments of the component (X) are present in the composition in a proportion in the range of 2-7% by weight, wherein the inorganic white pigment is selected to be exclusively titanium dioxide with an average particle size (D50) in the range of 0.1-10 μm.

* * * * *